May 12, 1953  J. B. HORD  2,638,126
DEVICE FOR FLUSHING DRAIN PIPES
Filed Dec. 27, 1949  2 Sheets-Sheet 1
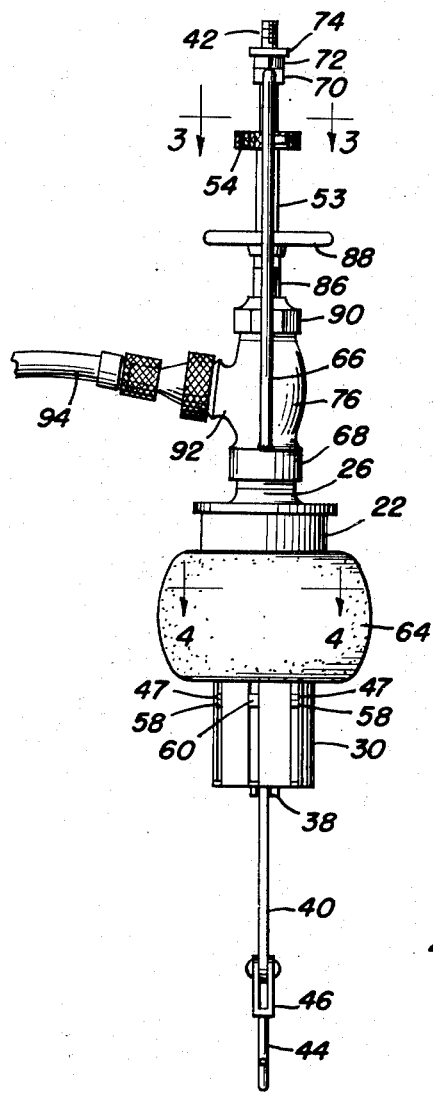
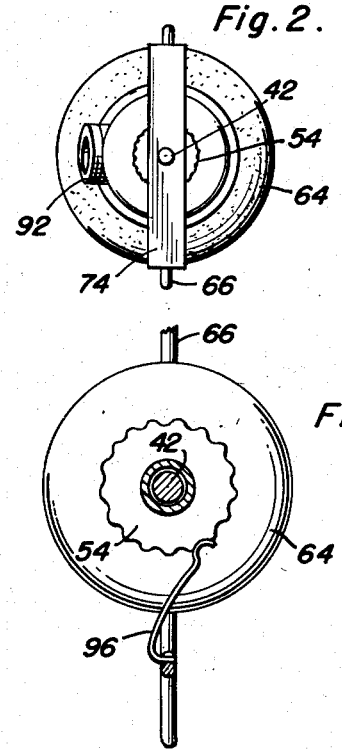
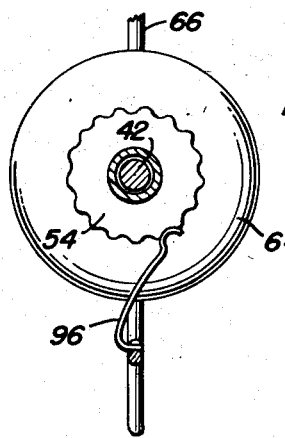
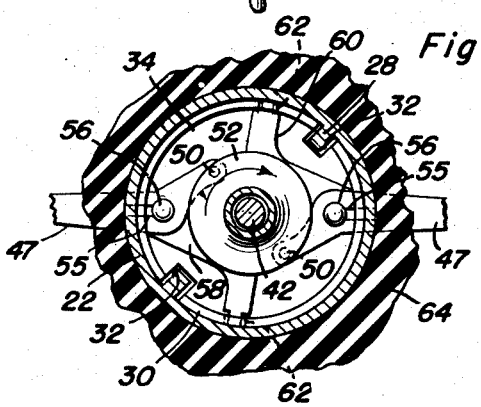
Inventor
Joseph B. Hord
By Clarence A. O'Brien
and Harvey B. Jacobson
Attorneys May 12, 1953 J. B. HORD 2,638,126
DEVICE FOR FLUSHING DRAIN PIPES
Filed Dec. 27, 1949 2 Sheets-Sheet 2
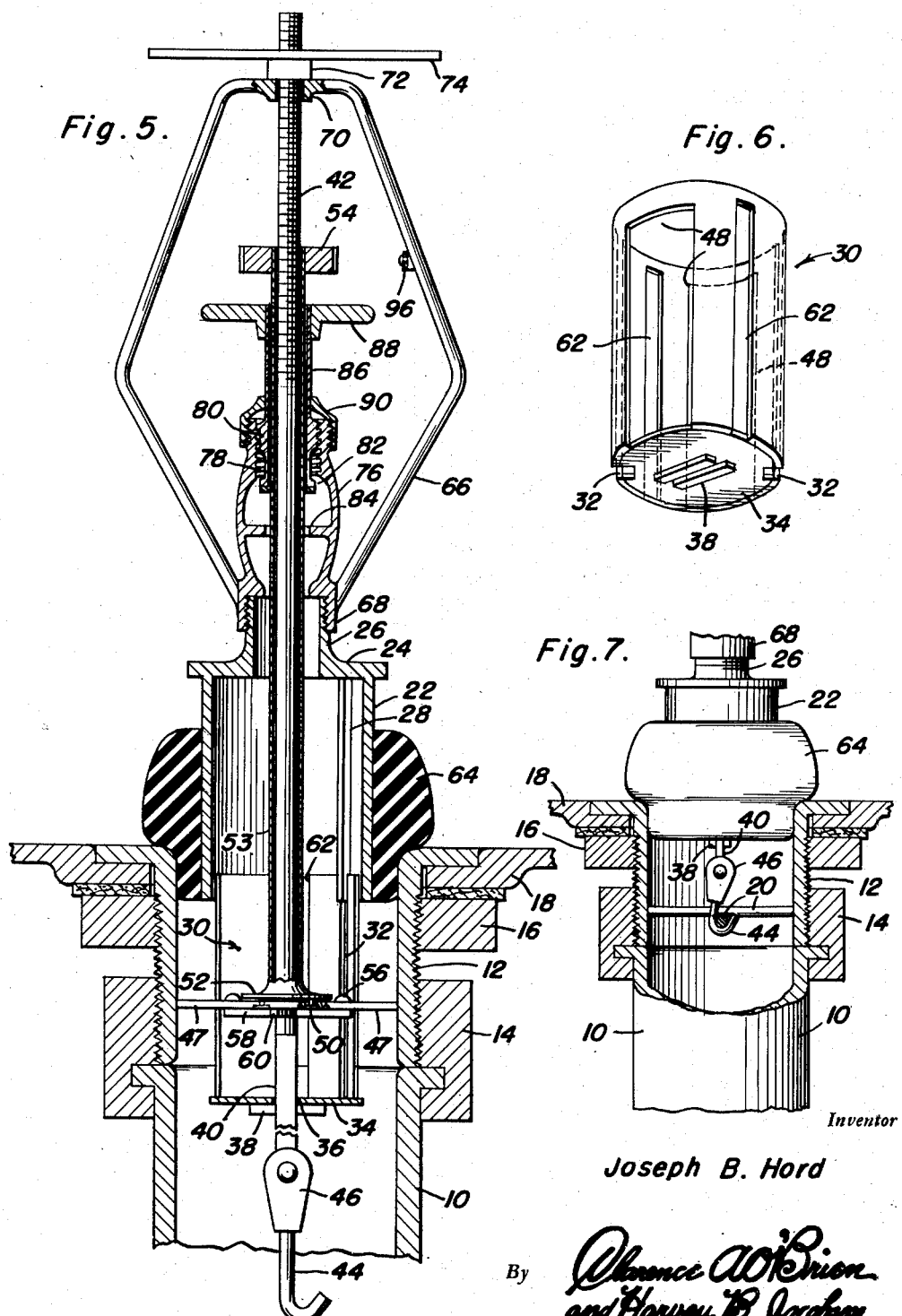
Inventor
Joseph B. Hord

UNITED STATES PATENT OFFICE 2,638,126

DEVICE FOR FLUSHING DRAINPIPES

Joseph B. Hord, Maxton, N. C.

Application December 27, 1949, Serial No. 135,268

6 Claims. (Cl. 137—741)

This invention relates generally to tools for plumbers and more particularly to a device for flushing drain pipes using fluid under pressure.

A primary object of this invention is to provide means for connecting an end of a tube in a drain pipe or the like so that fluid under pressure can be directed into the drain pipe, whereby a blocked drain pipe can be opened.

Another object of this invention is to provide an attachment for connecting a tube with a drain pipe and including means for conveniently controlling the flow of fluid after the connection is made.

Still another object of this invention is to provide an attachment of the character mentioned above which can be used with drain pipes having outlets with cross bar strainers, as well as with plain ended drain pipes and drain pipes with other types of decorative outlet fittings, the invention including means for securing the attachment frictionally on the bore surface of the drain pipe without dependence upon such structure as the above cross bar strainers.

Still another object of this invention is to provide an attachment of the character mentioned above which is adaptable for use with toilets, lavatories, bathtubs, dental bowls, scrub sinks, kitchen sinks and in still other environments, splashing and overflow of the above mentioned equipment being positively prevented, and the unblocking of such equipment being ordinarily effected very quickly and easily.

A last object to be mentioned specifically is to provide an attachment of the character mentioned above which is relatively inexpensive and practicable to manufacture, which is simple and safe to use, and which will give generally efficient and durable service.

With these objects definitely in view, this invention resides in certain novel features of construction, combination and arrangement of elements and portions as will be hereinafter described in detail in the specification, and particularly pointed out in the appended claims, and illustrated in the accompanying drawings which form a material part of this application, and in which:

Figure 1 is a side elevational view of the assembled device;

Figure 2 is a top plan view of the device with the pressure tube removed;

Figure 3 is a horizontal sectional view taken on the line 3—3 of Figure 1;

Figure 4 is a similar horizontal sectional view, fragmentary in character, taken on the line 4—4 in Figure 1;

Figure 5 is a vertical enlarged sectional view, taken substantially on a center line of the device and showing a portion of an environment wherewith this invention will ordinarily be used, the jaw assembly being in broken elevation;

Figure 6 is a view, in perspective, of the element hereinafter referred to as the inner cylinder; and Figure 7 is a vertical sectional view, fragmentary in character, showing the device in use with a drain pipe outlet having a cross bar strainer.

Similar characters of reference designate similar or identical elements and portions throughout the specification and throughout the different views of the drawings.

Referring now to the drawings in detail, this invention will ordinarily be used with a drain pipe 10 and an outlet 12 for such drain pipe, the drawings showing such an outlet connected by a coupling 14 on the upper end of the drain pipe 10. The outlet will ordinarily be flanged as shown and a lock nut 16 will be used to secure the outlet upon the apertured bottom 18 of the equipment such as the basin, bowl or the like to be flushed. It should be carefully noted, at this point, that the outlet 12 may have cross bar strainer structure illustrated at 20 in Figure 7, although the device is employable with plain ended pipes or plain outlets such as is illustrated in Figure 5.

The device includes an outer cylinder 22 having a top end plate 24 closing this top end of the cylinder except for the neck 26 which comprises a fluid conduit, the fluid used in this invention being ordinarily water although air or water burdened with chemicals, or still other fluids can be used. The outer cylinder 22 has longitudinally disposed internal ribs 28. An inner cylinder is telescopically arranged in the outer cylinder, this inner cylinder being generally indicated at 30 and illustrated separately from the other elements in Figure 6. The inner cylinder has longitudinally disposed slots 32 in the walls thereof to receive the ribs 28, whereby relative rotational movement between the cylinders is prevented, while axial movement is facilitated. The inner cylinder 30 has a bottom end plate 34 having an elongated slot 36 with the longitudinal edges reinforced by ribs 38 and the lower end portion 40 of an elongated threaded element 42 is slidably mounted within the slot 36 and between the ribs 38, this lower end 40 being flattened as indicated in Figures 1 and 5 to correspond generally with the shape of the slot 36, thus preventing rotational movement of the elongated element 42 relative to the inner cylinder 30. The lower end of the threaded element 42 is provided with a hook 44, which hook is preferably formed with an enlarged portion 46 pivoted on the lower end of the threaded element 42, this portion 46 acting as a stop to limit the upward movement of the threaded element relative to the end plate 34. In this connection, it should be noted that Figure 5 is not proposed as showing the element 42 in fully operative position, the inner cylinder 30 and the threaded element 42 being both shown in lowered position to facilitate the illustration of the invention.

A pair of opposing jaws 47 will extend through the large slots 48, best shown in Figure 6, in the inner cylinder, when these jaws are in operative positions and these jaws will be pivotally mounted on and carried by the disk 52, the means of attachment comprising pins 50. The disk 52 is terminally secured to a tubular shaft 53 arranged coaxially and exteriorly of the threaded element 42 and extending from the disk 52 upwardly to a point well above the outer cylinder 22, and a hand wheel 54 is rigidly secured to the upper end of this tubular shaft 53. Elongated slots 55 are provided in the jaws 47 at points spaced slightly from the pins 50, as best illustrated in Figure 4, and other pins 56, suitably headed, extend through the slots 55 and are rigidly secured to plate 58. It should be noted at this point, that although the element 52 has been described as a disk, any suitable transversely extending member of plate type can be used. The pins are secured to plate 58 disposed transversely and immediately beneath the jaws 47, and this plate has at least one pair of radially extending projections 60 which slide within slots 62 in the inner cylinder 30. From the above description it will be clear that the assembly comprising the disk 52, the jaws 47 and the plate 58 with the projections 60 moves with the tubular shaft 53, and this assembly can be raised and lowered by means of the hand wheel 54 and the wheel 54 when rotated manually will cause the jaws 47 to be extended or retracted into and out of engagement with the outlet 12, as desired.

A deformable resilient member 64, ordinarily composed of rubber or the like will be carried by the outer cylinder 22 and will ordinarily be bonded thereto by adhesive. This member 64 is, of course, adapted dimensionally to fit into and to seal the end of the outlet 12, as illustrated in Figures 5 and 7. A yoke 66, illustrated as comprised of two similar angulated arms, is provided with a threaded nut member 68 which is screwed onto the neck 26, while the other end of the yoke is provided with a collar 70 to comprise a seat for the nut 72 threaded onto the upper end of the threaded element 42. This nut 72 will preferably have wings 74 to facilitate the tightening of the nut 72 in order to pull the deformable resilient member 64 into the position shown in Figures 5 and 7.

A valve body 76 is formed integral with the nut member 68 of the yoke, and a valve 82 is used to close an opening 84 within the valve body 76, represented as being coaxial with the pivot element 42. A tubular valve stem 86 may be fixed to extend from the valve proper 82 coaxially and externally of the tubular shaft 53 and a second hand wheel 88 is rigidly secured to the upper end of the element 86 and the upper end of the valve body 76 is provided with a threaded bore 78 to receive a threaded enlargement 80 on the lower portion of the element 86, whereby operation of the hand wheel 88 will close and open the valve aperture 84 leading through the neck 26. The upper end of the valve body is provided with a screw cap 90 which serves as a bearing for the element 86, and it will be noted that the provision of the threaded elements 78 and 80 simplifies the matter of sealing the upper end of the valve body 76 against leakage of fluid. The valve body is provided with an outlet 92 to which a tube 94 will be attached by any suitable means in the actual operation of this device. Refinements of structure in this device will include means to retain the hand wheel 54 against movement after the jaws 47 have been set in position against the outlet 12, the means illustrated comprising a spring 96 having an arcuate end portion selectively engaging notches in a serrated edge portion of the hand wheel 54, the spring 96 being secured to an adjacent portion of the yoke 66.

As mentioned in one of the objects recited above, this invention is usable with an outlet 12 having cross bar strainer structure as illustrated at 20 in Figure 7. In this particular use of the invention, the jaws 47 will be employed merely as a steadying means or as auxiliary means to the hook 44 which will be engaged over one of the cross bars 20. It may also be noted that in this use, the jaws 47 are primarily effective in preventing rotation of the hook 44 and the enlarged portion 46 of the hook may not even be used as a stop in engagement with the end plate 34. Instead, however, it will be noticed that the enlargement 46 may be used as a stop while the hook 44 is used as illustrated in Figure 7, and the jaws 47 may also be simultaneously used, in order that an absolutely rigid connection with an outlet 12 may be effected. For this reason, the present disclosure does not represent alternative structure, although alternative mode of employment of the device is described herein.

The operation of this invention has been referred to fully in the above description of the mechanical details of the invention and in the above recited objects, and further description would appear unnecessary.

Having described the invention, what is claimed as new is:

1. A device for opening a blocked drain pipe comprising an outer cylinder, an inner cylinder telescopically mounted in the outer cylinder, means to prevent relative rotational movement between the cylinders, means to fasten the inner cylinder in a drain pipe, means to move the outer cylinder axially with respect to the inner cylinder, a deformable resilient member on the outer cylinder for sealing engagement with the drain pipe, and a conduit leading into said outer cylinder, said outer cylinder having a manually operable valve controlling flow from said conduit into said outer cylinder.

2. A device for opening a blocked drain pipe comprising an outer cylinder, an inner cylinder telescopically mounted in the outer cylinder and having one end extending beyond said outer cylinder, longitudinal ribs on the inner surface of the outer cylinder, said inner cylinder having slots to receive said ribs and having an end plate on said one end of the inner cylinder, a yoke on the outer cylinder extending from the end of the outer cylinder remote from said plate, an elongated threaded element extending coaxially through said cylinders and yoke and engageable with said end plate and adjustably engaged with said yoke, a transversely extending member in said inner cylinder, jaws on said transversely extending member, means to extend said jaws radially of the inner cylinder, a deformable resilient member on the outer cylinder for sealing engagement with the drain pipe, and a valved conduit leading into said outer cylinder.

3. A device according to claim 2, and wherein said jaws extend through longitudinal slots in said inner cylinder to engage a pipe, whereby the cylinders and deformable member are prevented from rotating on the drain pipe when the jaws are extended.

4. A device for opening a blocked drain pipe comprising an outer cylinder, an inner cylinder telescopically mounted in the outer cylinder and having one end extending beyond said outer cylinder, longitudinal ribs on the inner surface of the outer cylinder, said inner cylinder having slots to receive said ribs and having an end plate on said one end of the inner cylinder, a yoke on the outer cylinder extending from the end of the outer cylinder remote from said plate, an elongated threaded element extending coaxially through said cylinders and yoke and engageable with said end plate and adjustably engaged with said yoke, a transversely extending plate within said inner cylinder and mounted for movement axially of the inner cylinder, jaws on said transversely extending plate, means to extend said jaws radially and exteriorly of the inner cylinder, a deformable resilient member on the outer cylinder for sealing engagement with the drain pipe, and a conduit leading into said outer cylinder, said outer cylinder having a manually operable valve controlling flow from said conduit into said other cylinder, said end plate having a non-circular aperture, and the corresponding end of the threaded element being correspondingly shaped and dimensioned to slide within said aperture and having a hook larger than the aperture and disposed exteriorly of the end plate.

5. A device according to claim 2, and wherein the valve is mounted on the end of said outer cylinder remote from the jaws, and said valve has a tubular valve control stem arranged coaxially and externally of said elongated threaded element.

6. A device acording to claim 2, and wherein said means to extend the jaws comprises pins on said transversely extending member and extending into sockets in said jaws, an elongated tubular member secured to said transversely extending member and mounted coaxially of and extending beyond the outer cylinder, and means on said tubular member to facilitate manual rotation thereof.

JOSEPH B. HORD.

References Cited in the file of this patent

UNITED STATES PATENTS

| Number | Name | Date |
|--------|------|------|
| 532,527 | Cahill | Jan. 15, 1895 |
| 2,428,381 | Parry | Oct. 7, 1947 |